(12) United States Patent
Mercado Diez et al.

(10) Patent No.: US 9,228,562 B2
(45) Date of Patent: Jan. 5, 2016

(54) CONVERTIBLE WIND TURBINE NACELLE COVER

(75) Inventors: Luis I. Mercado Diez, Lugo (ES); José M. Hoyos Irisarri, Lugo (ES)

(73) Assignee: NORVENTO ENERGIA DISTRIBUIDA, S.L. (ES)

( * ) Notice: Subject to any disclaimer, the term of this patent is extended or adjusted under 35 U.S.C. 154(b) by 651 days.

(21) Appl. No.: 13/610,226

(22) Filed: Sep. 11, 2012

(65) Prior Publication Data

US 2013/0089433 A1 Apr. 11, 2013

(30) Foreign Application Priority Data

Sep. 16, 2011 (EP) .................................... 11382297

(51) Int. Cl.
*F03D 1/00* (2006.01)
*F03D 11/00* (2006.01)

(52) U.S. Cl.
CPC .............. *F03D 1/003* (2013.01); *F03D 11/00* (2013.01); *F05B 2230/80* (2013.01); *F05B 2240/14* (2013.01); *Y02E 10/722* (2013.01); *Y02E 10/726* (2013.01)

(58) Field of Classification Search
CPC ...... F03D 1/003; F03D 11/00; F03D 11/0091
USPC .............................. 415/201, 232; 416/244 R
See application file for complete search history.

(56) References Cited

U.S. PATENT DOCUMENTS

| 2009/0267038 A1* | 10/2009 | Teichert et al. ............... 254/335 |
| 2013/0115099 A1* | 5/2013 | Valero Lafuente et al. ... 416/244 R |
| 2014/0050591 A1* | 2/2014 | Munk-Hansen .......... 416/244 R |

FOREIGN PATENT DOCUMENTS

WO WO9206295 A1 * 4/1992 ............. F03D 11/00

* cited by examiner

*Primary Examiner* — Igor Kershteyn
*Assistant Examiner* — Woody A Lee, Jr.
(74) *Attorney, Agent, or Firm* — Gerald E. Hespos; Michael J. Porco; Matthew T. Hespos (57) ABSTRACT

A convertible nacelle cover with an integrated platform for avoiding the use of auxiliary devices when performing maintenance operations on the components of a wind turbine nacelle, in cases in which the nacelle is not large enough to allow workers to stand on it. The cover has at least two movable parts, which can be opened for maintenance operations, in such a manner that one of them becomes a working platform. Therefore, the nacelle cover is, per se, the place where the operator stands to perform the maintenance operations. It is especially designed to be used in small and medium size wind turbines.

14 Claims, 11 Drawing Sheets

CONVERTIBLE WIND TURBINE NACELLE COVER

The present invention relates to wind turbines, especially to small and mid power machines, which size frequently makes it not possible to gain access and perform maintenance operations inside the nacelle.

BACKGROUND ART

Wind energy is one of the more extended renewable energy resources. This kind of energy easily covers a wide power range with reduced costs.

Nowadays, the most common application of wind energy is the utility-scale generation by means of wind farms consisting on several large turbines, each one with a power of at least 800 kW. However, a newer and promising application is the use of small and medium size turbines (normally below 500 kW) in distributed generation.

The size of these turbines allows placing them near to the point where the generated energy will be used. In those cases it is not necessary a transport grid. The use of small and medium size turbines makes it possible to generate renewable energy at low cost close to factories or industrial areas, for example.

For the reasons above, the development of small and medium size wind turbines is increasing nowadays.

One difficulty in small and medium turbines is that their relatively small size makes it impossible to apply the usual solutions of large wind turbines to allow the maintenance personnel both accessing and working on the components of the nacelle.

Indeed, the nacelle of large turbines is reached by means of a ladder or, more commonly, an elevator inside the tower, and once there the maintenance operations can be conveniently performed since the space inside the nacelle cover is enough to work.

However, in most small and medium wind turbines, the tower is too small to allow an elevator inside, and the only way to access the nacelle through the tower is by means of a ladder fixed outside of it, although in the bigger designs sometimes the ladder can be placed inside.

Moreover, a second problem once the worker has climbed to the tower top, is that he has not an adequate and safe place to stand while performing the maintenance operations, with good access to the nacelle components.

To solve this problem, many small and medium size wind turbines are equipped with a platform at the top of the tower, just below the yaw gear, which is reached by means of the mentioned ladder (in case of inside ladders, a door is provided at the top of the tower). Standing there, the worker removes the cover to operate on the components, a difficult job due to the small size of the platform (limited by the overhang distance between tower and blades) and, especially in the case of bigger designs, because some of the parts can be hardly reached from the working position. On the other hand, this fixed platform affects negatively to the aesthetics of the turbine and can even induce a shadow effect on the rotor when the turbine is turning, increasing loads.

In other small and medium size wind turbines, lifting platforms or cranes must be used to reach and work on the nacelle components during maintenance, increasing the O&M costs and adding the problem of the limited availability of these devices. Finally, in some turbines the nacelle has to be brought down in order to perform the maintenance operations on the ground, a complex and time-consuming practice, especially in the bigger turbines of this range.

In all cases, the nacelle cover has to be removed to reach the elements of the wind turbine equipment.

SUMMARY OF THE INVENTION

The present invention relates to a convertible wind turbine nacelle cover which consists on a new concept, named "convertible nacelle cover". The present invention allows operators to work on the nacelle components of a wind turbine minimizing the attachments to the turbine and avoiding the use of lifting platforms.

When the turbine is in operation, the nacelle is in a closed position, so the cover forms a closed envelope as in standard turbines, with all its parts joined together in contact. When it is necessary to perform maintenance operations in the nacelle, the nacelle cover can be opened, separating the cover parts from each other, in such a way that a platform, which is integrated in one of those parts, is accessible, so an operator can stand on it and perform the mentioned operations.

The nacelle cover comprises at least two parts being the working platform integrated in one of said parts. This is the most important feature of the present invention. The working platform is integrated in the nacelle cover so it is the nacelle cover per se the place where the operators work.

BRIEF DESCRIPTIONS OF THE DRAWINGS

FIG. 1 shows one of the preferred embodiments, in which the cover includes three parts where an upper part and a lower part are moved towards the front of the turbine, allowing the rear part to turn.

FIG. 2 shows another embodiment of the invention, in which the cover has a left and a right part which are opened upwards, and a third part which turns to open.

DETAILED DESCRIPTION OF THE PREFERRED EMBODIMENTS

The convertible wind nacelle cover of the present invention comprises at least two parts which are in direct contact when the cover is in a closed position and which can be moved to open the cover. One of said at least two parts has a working platform integrated on it so when the cover is opened the maintenance operations can be performed from the working platform which is part of the cover.

Figure 1A:
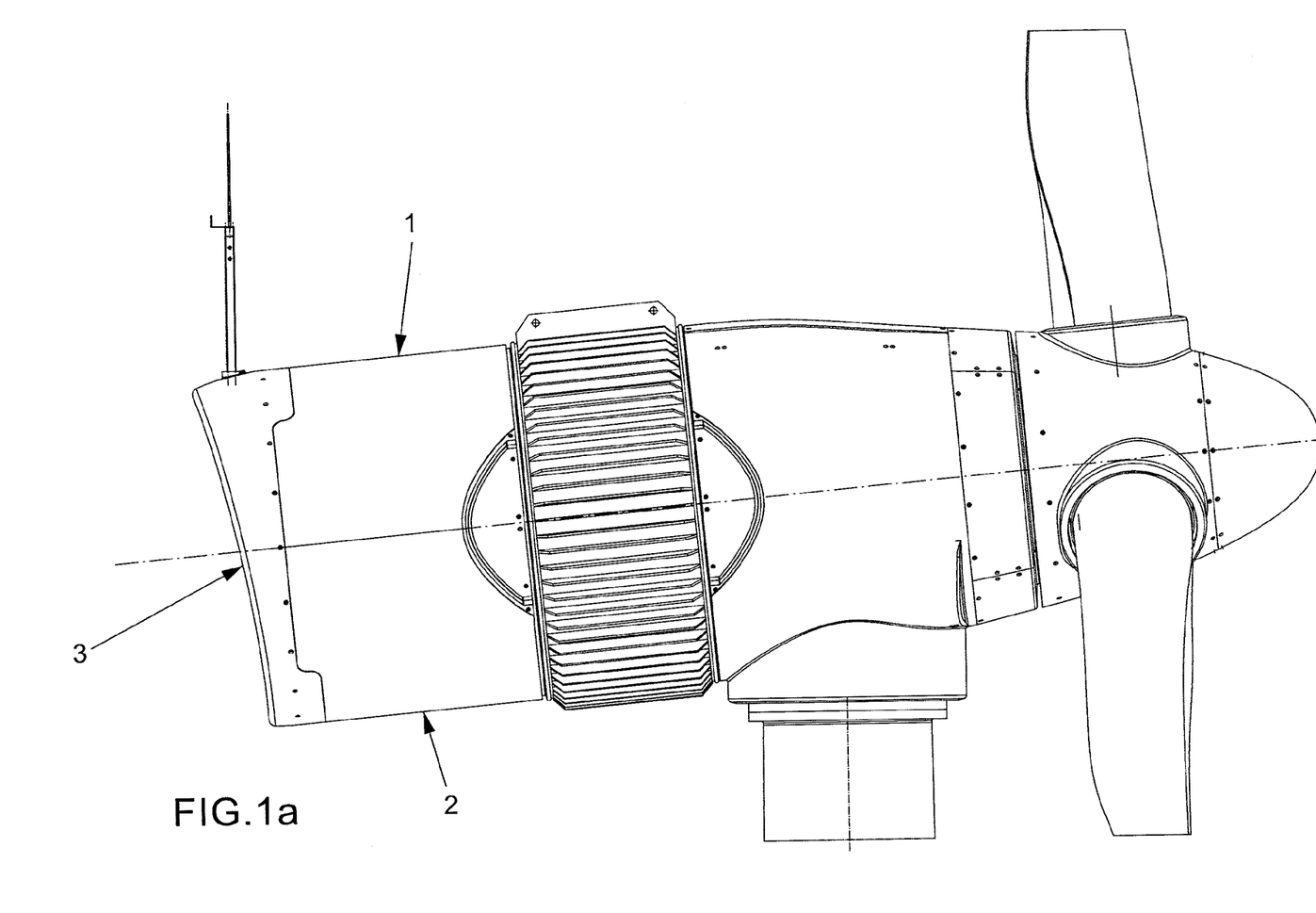
In FIGS. 1a to 1d the movements of the parts of the cover are represented and it is shown the sequence to open the cover of the represented embodiment.
Figure 1B:
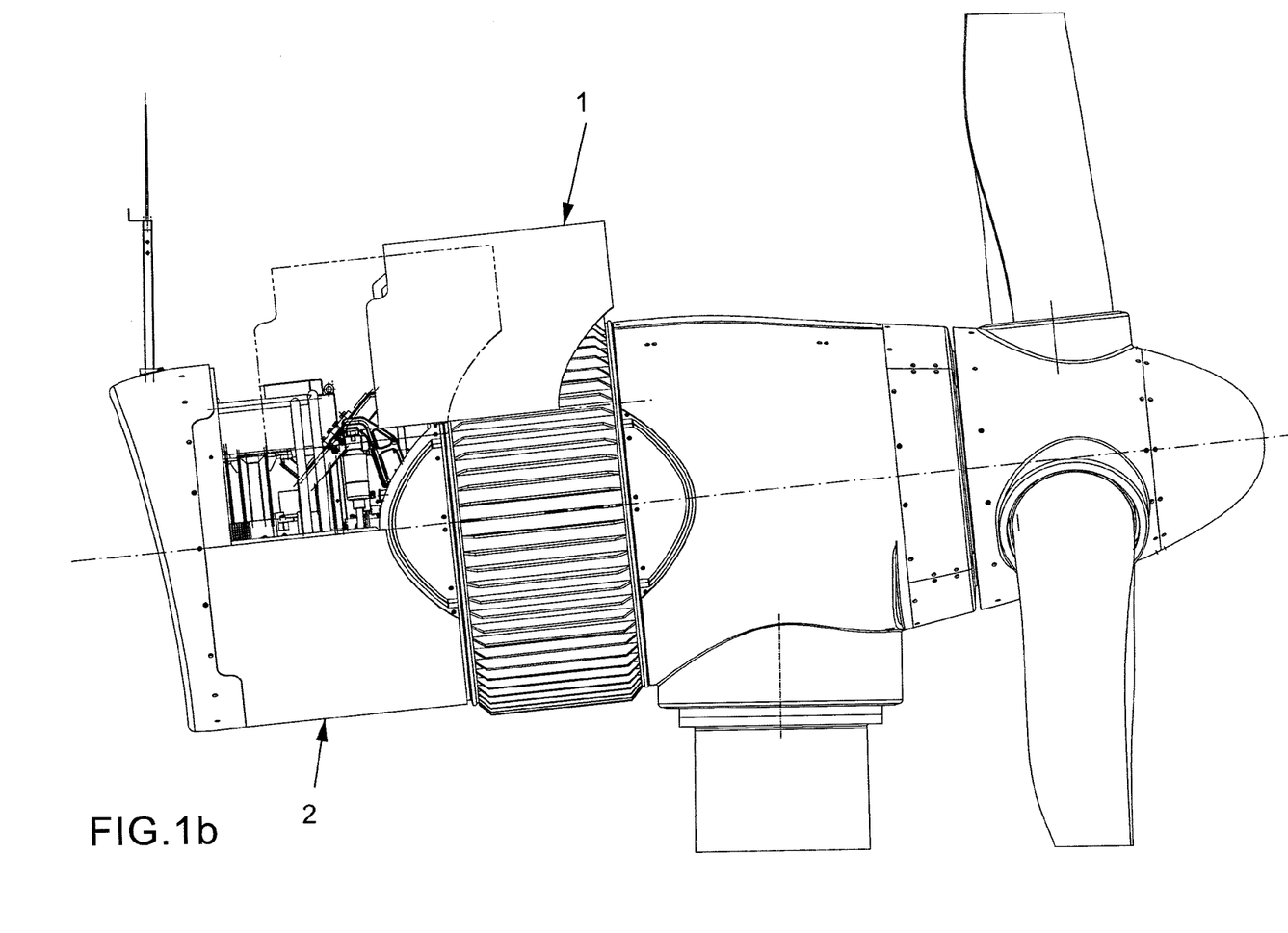
Figure 1C:
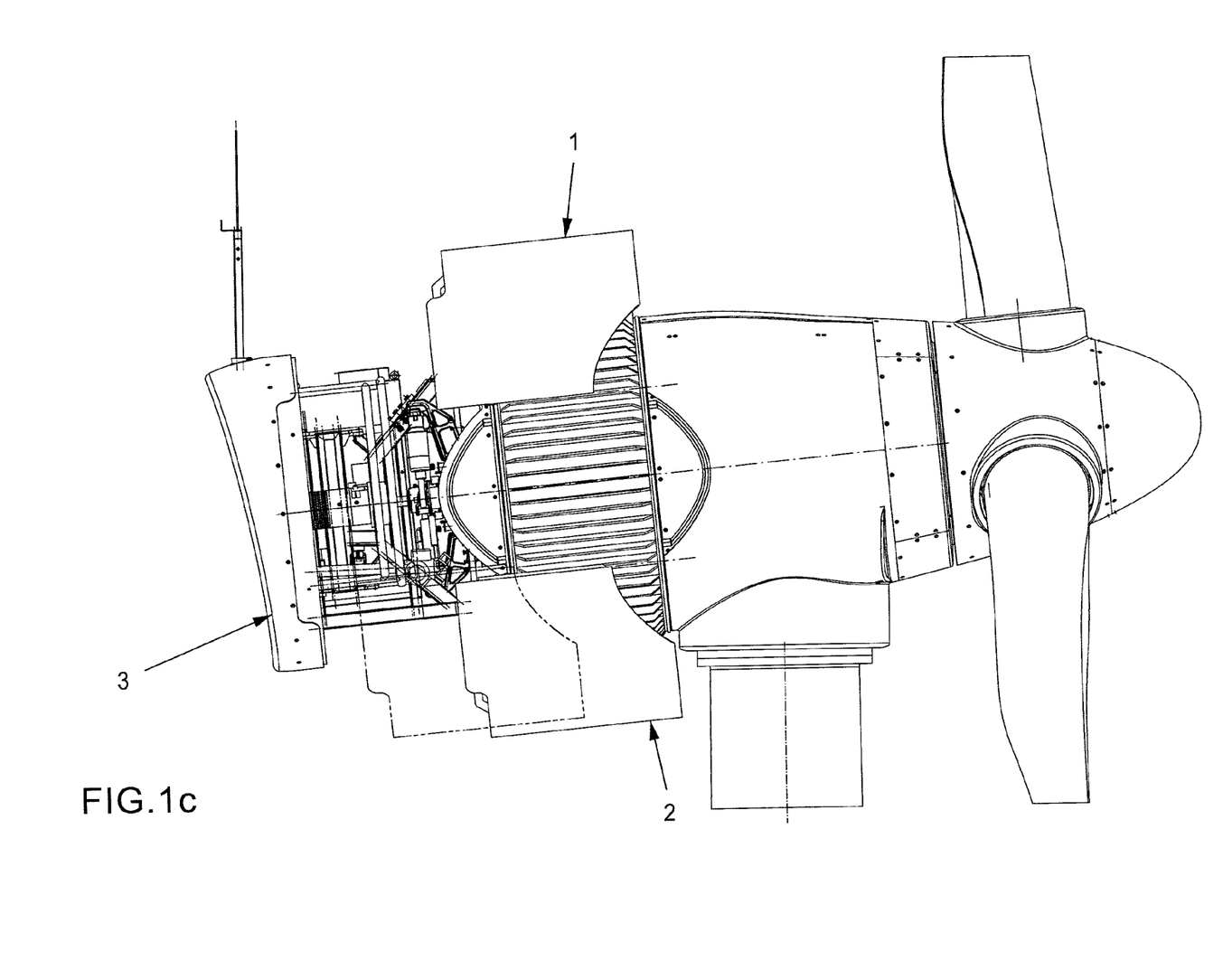
Figure 1D:
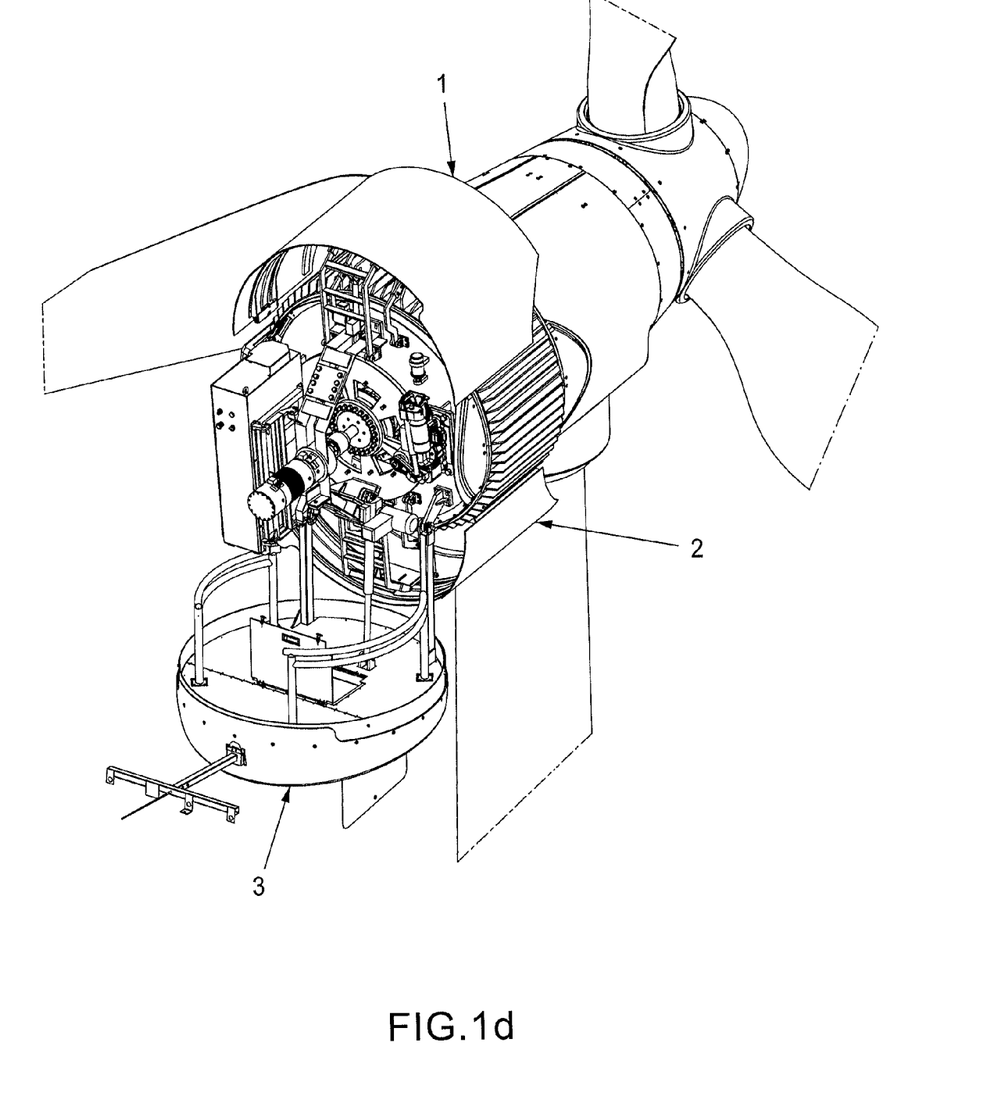

In a first embodiment of the invention (FIG. 1), the convertible nacelle cover comprises three parts which are an upper part (1), a lower part (2) and a rear part (3) (FIG. 1a), arranged in a way that the opened position of the nacelle cover is reached moving up the upper part (FIG. 1b) and moving down the lower part (2) (FIG. 1c). Once these two parts are opened, the rear part (3), which integrates the working platform, is opened pivoting around a horizontal axis until the platform integrated on said rear part (3) reaches a horizontal position (FIG. 1d).

Figure 2A:
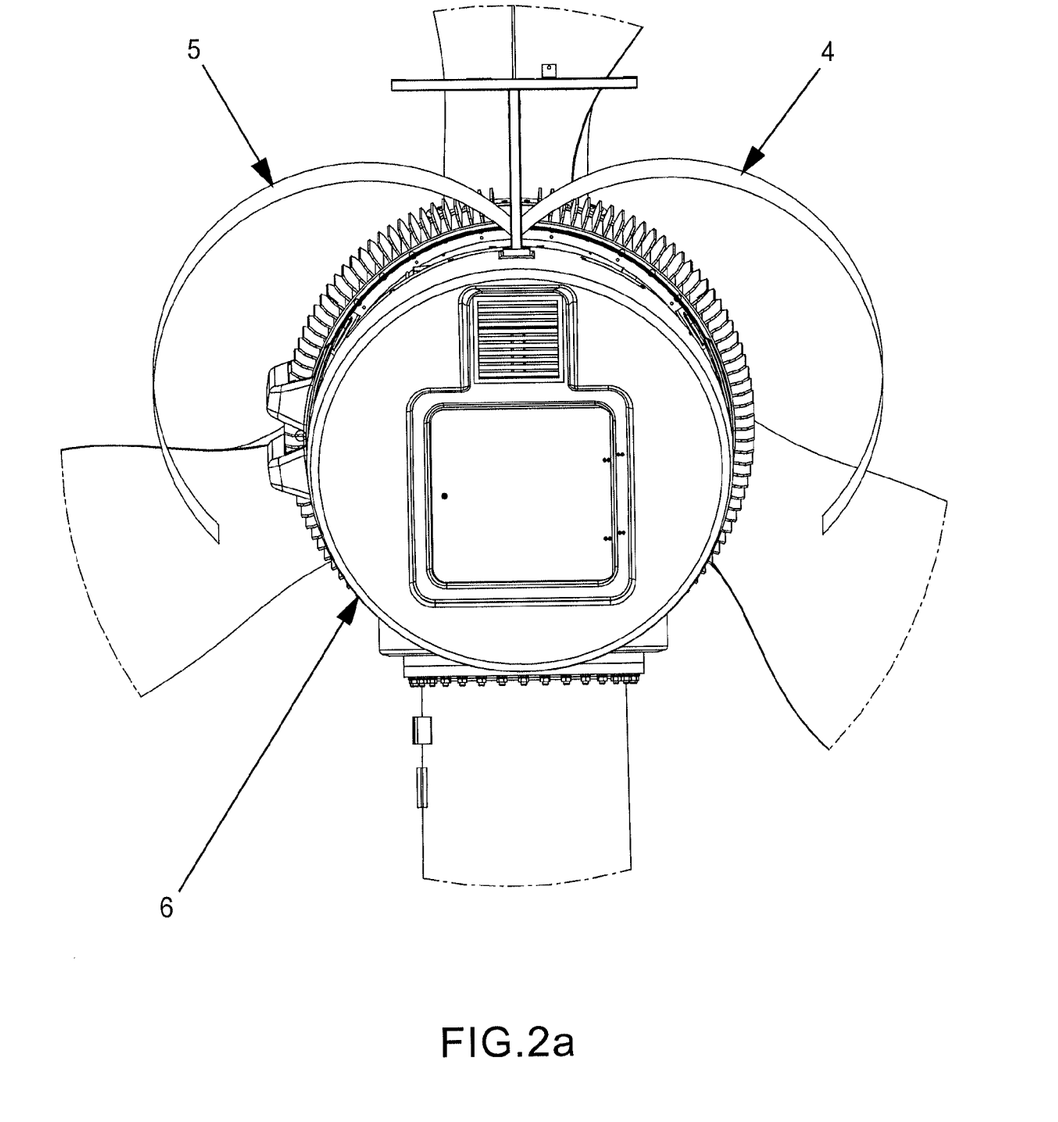
In FIGS. 2a to 2c the movements of the parts of the cover are represented and it is shown the sequence to open the cover of the represented embodiment.
Figure 2B:
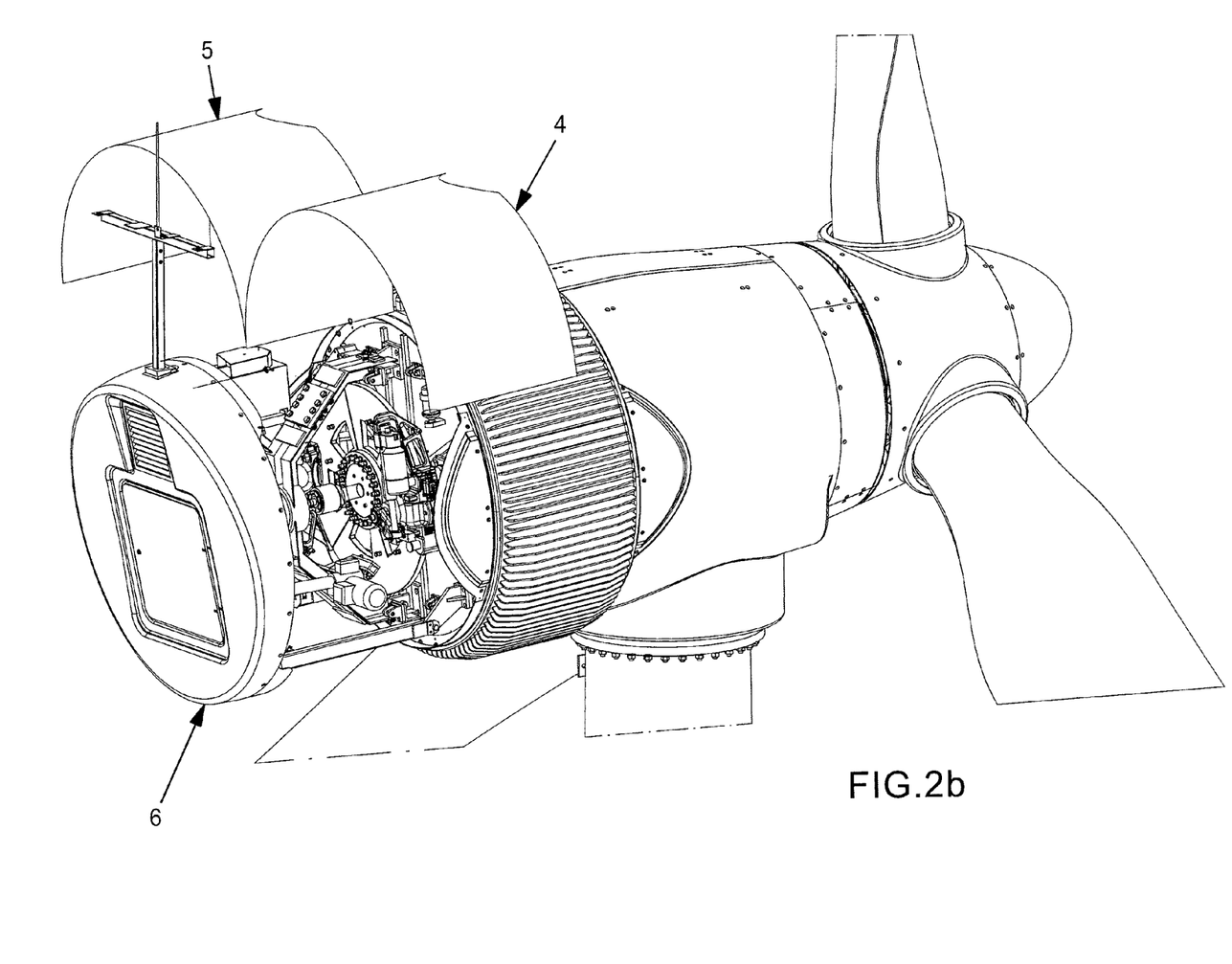
Figure 2C:
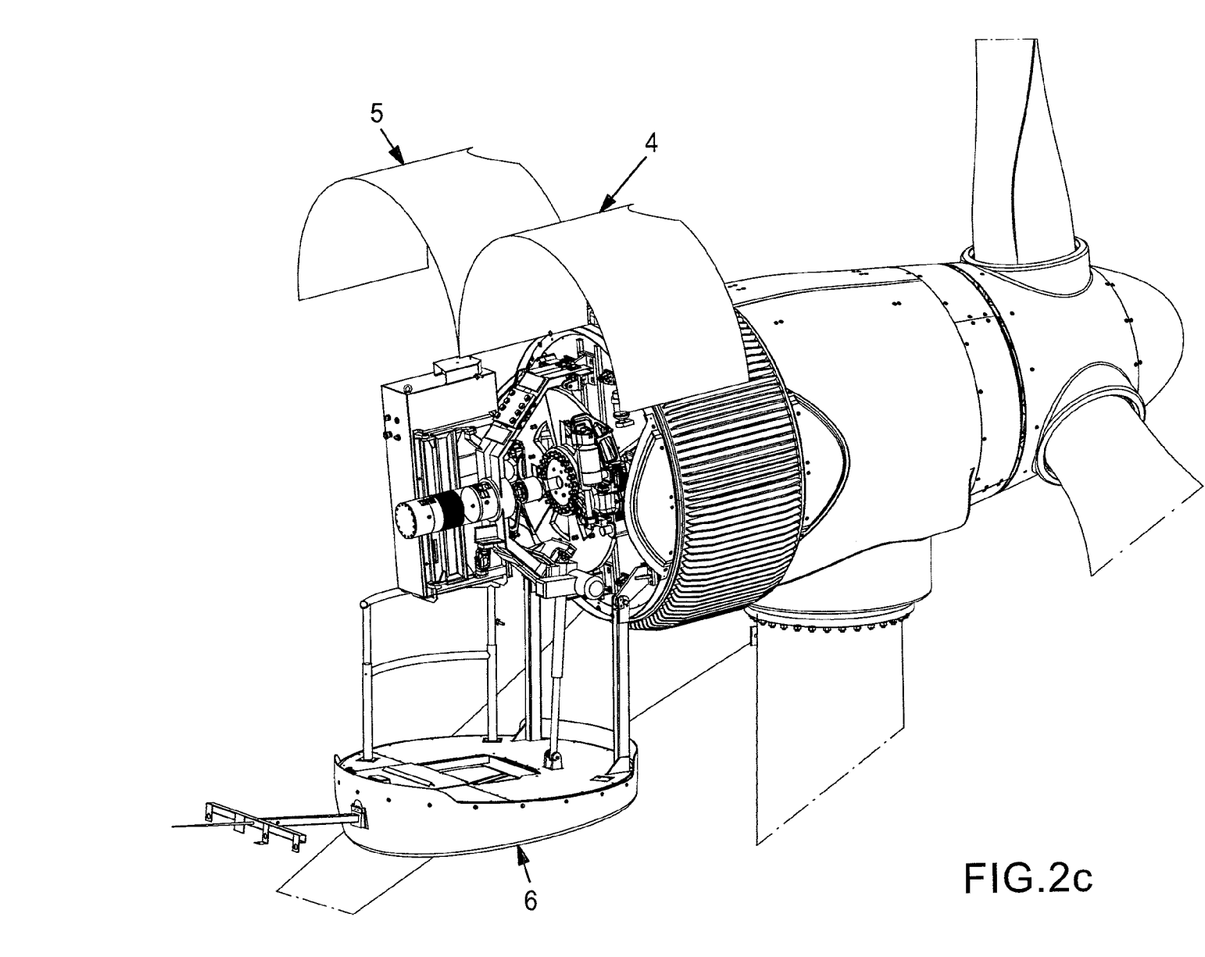

In another embodiment of the invention (FIG. 2), the convertible nacelle cover comprises three parts which are a right part (4), a left part (5) and a third part (6) (FIG. 2a), arranged in such a way that the opened position of the nacelle cover is reached pivoting the right part (4) and the left part (5) around an axis located on the top of the nacelle (FIG. 2b). Once these two parts are opened, the third part (6), which integrates the working platform, is opened pivoting around a horizontal axis until the platform integrated on said rear part reaches a horizontal position (FIG. 2c).

When the nacelle cover of the present invention is in an opened position, the convertible nacelle cover is closed following the inverse sequence than the opening sequence.

The relative movements of the cover parts can be achieved by linear actuators or rotary motors conveniently integrated with the mechanism structure. The actuators or motors can be driven electrically (AC or DC), hydraulically, pneumatically, by springs or even manually.

Figure 3:
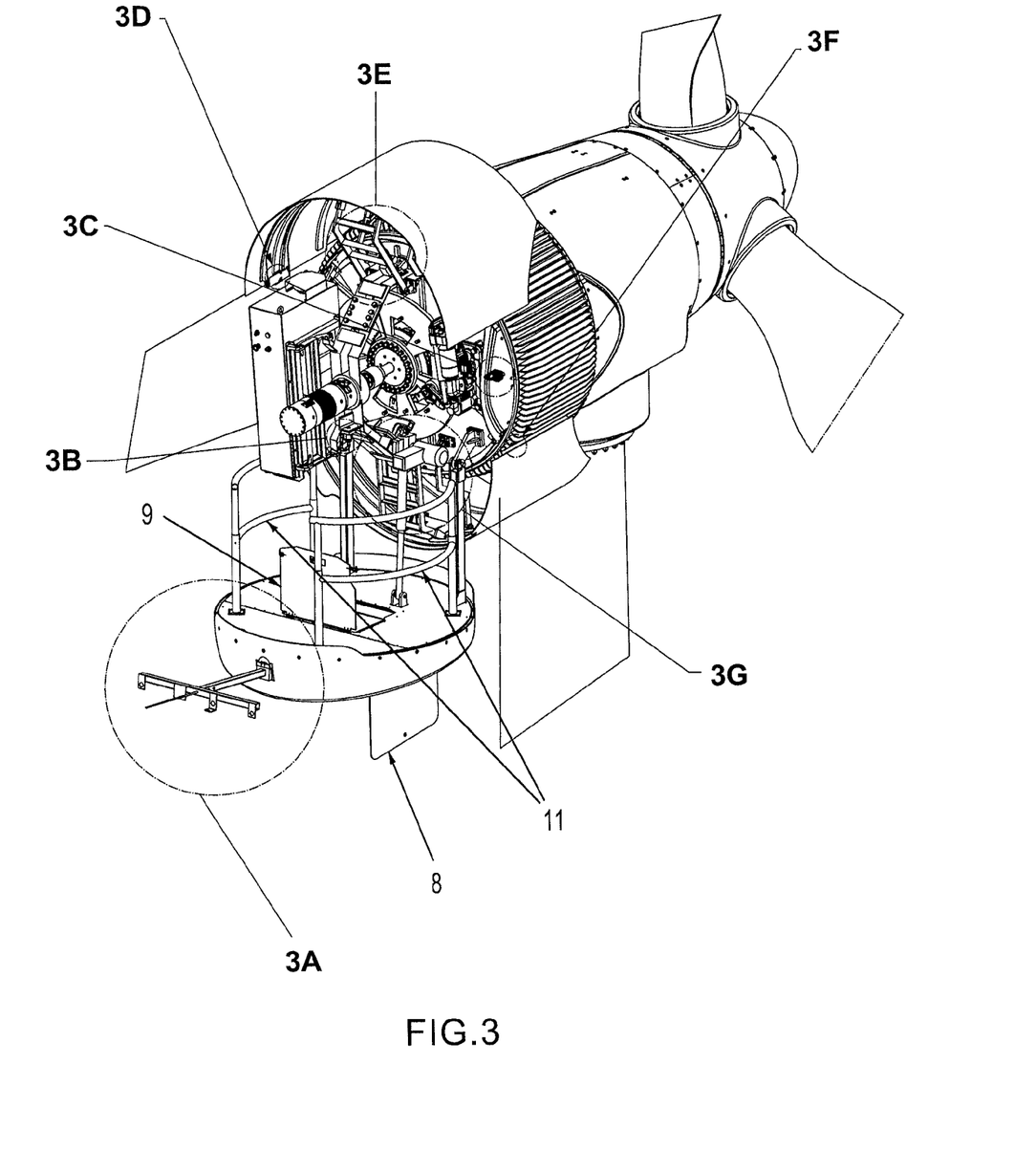
FIG. 3 shows a view of an embodiment of the present invention.
Figure 3A:
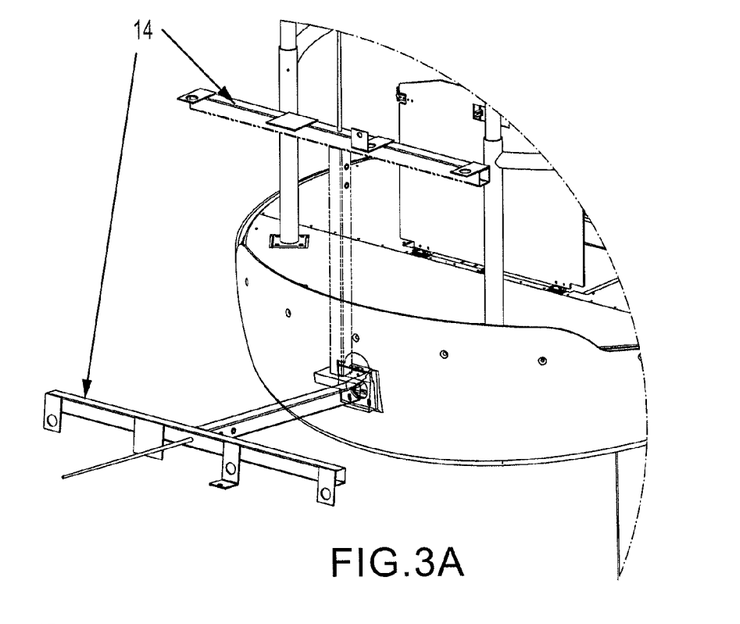
Figures 3B, 3C:
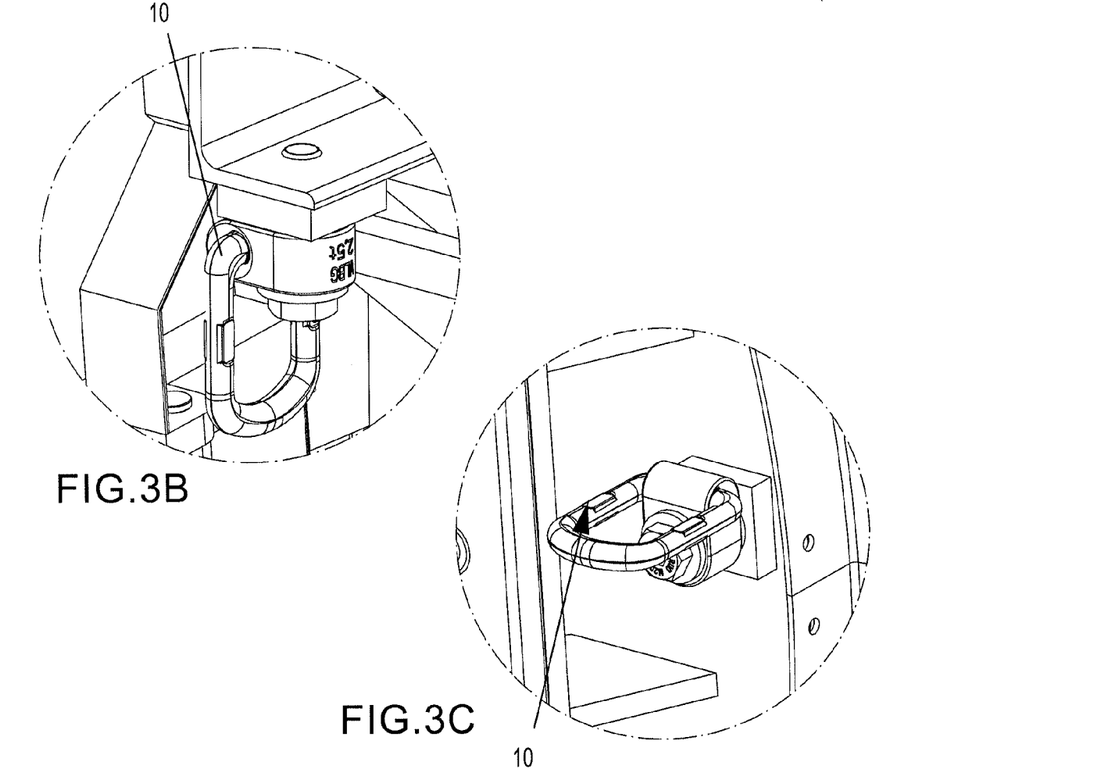
Figure 3D:
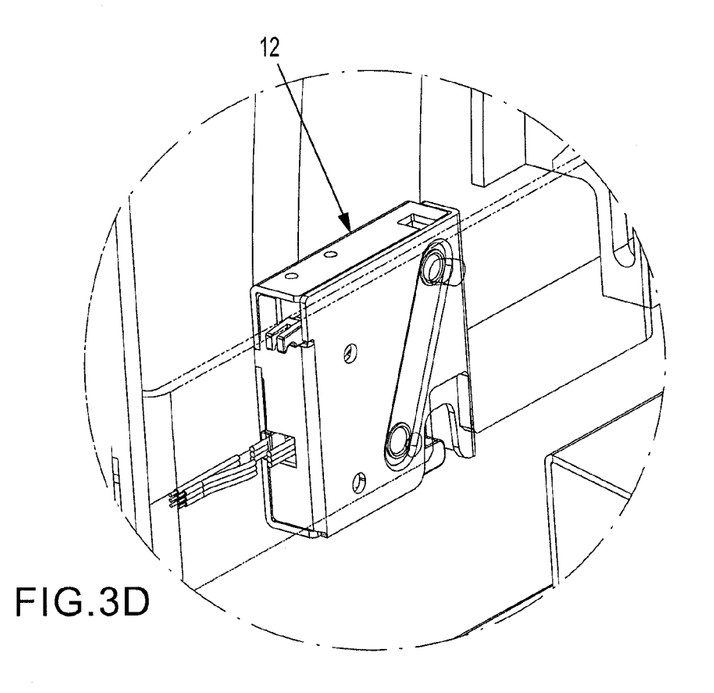
Figure 3E:
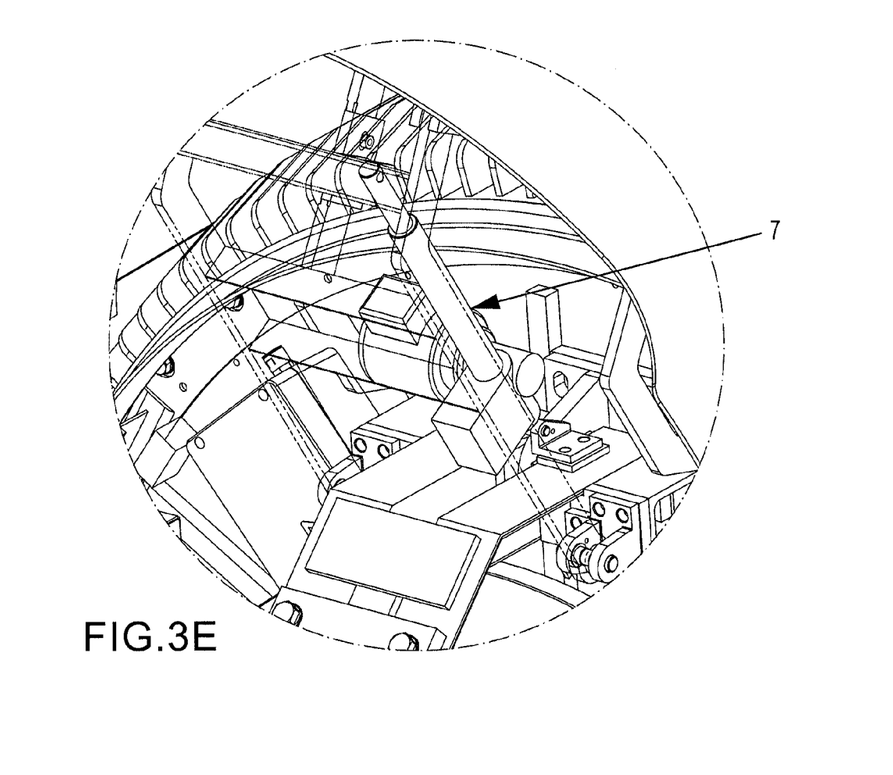
Figure 3F:
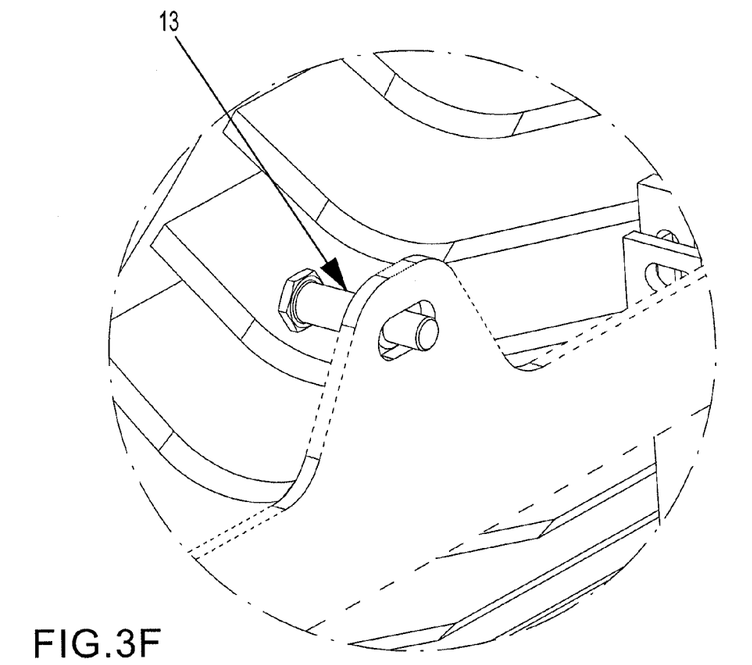
Figure 3G:
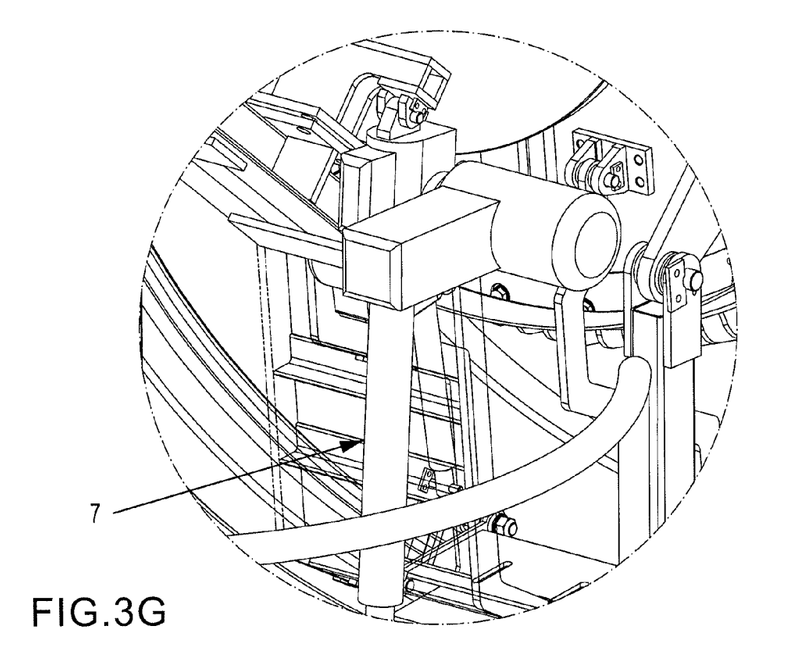

Some additional elements are included to any possible embodiment of the invention, as described below. FIG. 3 shows a possible configuration of the present invention. As can be seen from FIG. 3, actuators (7) can be used for the cover parts movement.

Also hatches (8, 9) can be included in the present invention in the part of the cover which has the working platform. The hatches are especially useful in cases where the access to the working platform is allowed from below. In said cases, to access the working platform, the operator opens the hatch (8) placed in the outside of the cover and passes to the working platform. When the operator is on the platform, he closes the hatch (9) placed in the working platform so he can stay safely in the platform. In case that access to the platform can be gained from the front, from one side or from above, the hatches would not be necessary.

Other elements applicable to any embodiment of the invention are security anchors (10), which are provided for the safety of the operator. These anchors can be included in the cover or platform itself and/or directly on the turbine structure, ensuring that the worker can reach them. Safety can also be increased by means of a handrail (11), embodied with the working platform, which can be either fixed, or partially or completely removable.

The invention can also include some devices to fix the cover parts together, avoiding any movement between them when the convertible cover is closed, like for instance security locks (12) in which a bolt (13) is trapped when the cover parts are together. In case of remote operation of the cover movement, these locking devices shall be operated remotely, as well as the linear actuators or motors, ensuring that they are opened before the opening movement of the cover starts.

Finally, the maintenance works on the wind turbine nacelle sensors can be enhanced if these sensors are placed on a support (14) which is placed in the rear part of the cover, fixed by means of a hinge mechanism, which allows turning it when the worker is on the platform, as shown in FIG. 3.

The invention claimed is:

1. A convertible wind turbine nacelle cover, comprising:
    an upper part;
    a lower part opposite the upper part and in contact with the upper part when the cover is closed;
    a rear part; and
    at least one driving device configured to separate the upper part and the lower part from each other by moving the upper part upwards and the lower part downwards away from the upper part, and to pivot the rear part about an axis into a horizontal position to define a working platform, wherein the working platform may support maintenance workers standing thereon.

2. The convertible wind turbine nacelle cover of claim 1, wherein at least one hatch is provided which can be opened and closed from the outside of the cover and from the working platform.

3. The convertible wind turbine nacelle cover of claim 1, further comprising security anchors placed either inside the nacelle cover, in the platform or in the turbine structure.

4. The convertible wind turbine nacelle cover of claim 1, wherein the platform has a handrail which can be fixed or partially or fully removable by the operator.

5. The convertible wind turbine nacelle cover of claim 1, wherein the upper and lower parts are kept together when the cover is closed by means of a locking device.

6. The convertible wind turbine nacelle cover of claim 1, wherein the cover includes a sensor support which is arranged to rotate towards the working platform in order to facilitate the maintenance works on sensors by the operator.

7. The convertible wind turbine nacelle cover of claim 5, wherein the locking device comprises a security lock and a bolt engageable with each other when the cover is closed.

8. A convertible wind turbine nacelle cover, comprising:
    a left part pivotable about a first axis at the top of the nacelle between a closed position and an opened position;
    a right part, pivotable about the first axis in a direction opposite the left part between a closed position and an opened position;
    a rear part, pivotable about a second axis in order to reach a horizontal position to define a working platform on which maintenance workers can stand; and
    at least one driving device configured to pivot the left and right parts away from each other about the first axis into the opened position and the rear part about the second axis into the horizontal position.

9. The convertible wind turbine nacelle cover of claim 8, wherein at least one hatch is provided which can be opened and closed from the outside of the cover and from the working platform.

10. The convertible wind turbine nacelle cover of claim 8, further comprising security anchors placed either inside the nacelle cover, in the platform or in the turbine structure.

11. The convertible wind turbine nacelle cover of claim 8, wherein the platform has a handrail which can be fixed or partially or fully removable by the operator.

12. The convertible wind turbine nacelle cover of claim 8, wherein the left and right parts are kept together when the cover is closed by means of a locking device.

13. The convertible wind turbine nacelle cover of claim 12, wherein the locking device comprises a security lock and a bolt engageable with each other when the cover is closed.

14. The convertible wind turbine nacelle cover of claim 8, wherein the cover includes a sensor support which is arranged to rotate towards the working platform in order to facilitate the maintenance works on sensors by the operator.

* * * * *